United States Patent
Perez, Jr.

(10) Patent No.: US 11,680,661 B2
(45) Date of Patent: Jun. 20, 2023

(54) STABILIZATION BRACKET DEVICE

(71) Applicant: Refugio Perez, Jr., McAllen, TX (US)

(72) Inventor: Refugio Perez, Jr., McAllen, TX (US)

(\*) Notice: Subject to any disclaimer, the term of this patent is extended or adjusted under 35 U.S.C. 154(b) by 14 days.

(21) Appl. No.: 17/388,724

(22) Filed: Jul. 29, 2021

(65) Prior Publication Data

US 2023/0034608 A1 Feb. 2, 2023

(51) Int. Cl.
*F16L 3/10* (2006.01)

(52) U.S. Cl.
CPC .................... *F16L 3/1066* (2013.01)

(58) Field of Classification Search
CPC ......... F16L 3/1066; F16L 3/21; F16L 3/1075; F16L 3/12; F16L 3/1083; F16L 3/1091; F16L 3/1211; F16L 55/0335; F16L 55/035
See application file for complete search history.

(56) References Cited

U.S. PATENT DOCUMENTS

| | | | | |
|---|---|---|---|---|
| 5,381,833 A | * | 1/1995 | Cummings | F16L 59/135 141/334 |
| 5,833,179 A | | 11/1998 | VandenBerg | |
| 5,906,341 A | | 5/1999 | Brown | |
| 6,224,025 B1 | * | 5/2001 | Alvarez | F16L 59/135 24/339 |
| 6,776,184 B1 | * | 8/2004 | Maichel | F16L 55/105 251/327 |
| 7,267,254 B2 | | 9/2007 | Perez | |
| 8,141,826 B1 | | 3/2012 | Gallardo | |
| 8,297,561 B1 | * | 10/2012 | Montplaisir | G01L 5/0052 248/58 |
| 8,322,662 B2 | * | 12/2012 | Heath | F16L 3/11 248/62 |
| 9,383,039 B2 | * | 7/2016 | Hirst | F16L 3/16 |
| 2005/0121559 A1 | | 6/2005 | King | |
| 2015/0159781 A1 | | 6/2015 | Wilson | |
| 2017/0227142 A1 | * | 8/2017 | Huang | F16L 3/1008 |

FOREIGN PATENT DOCUMENTS

| | | | |
|---|---|---|---|
| CN | 204417525 U | * 6/2015 | |
| FR | 3106168 A1 | * 7/2021 | ............... B25B 5/12 |
| KR | 20090006003 U | * 6/2009 | |

OTHER PUBLICATIONS

Eaton B-Line 2019 Pipe hangers & supports catalog (Year: 2019).*

\* cited by examiner

*Primary Examiner* — Terrell L McKinnon
*Assistant Examiner* — Ding Y Tan

(57) ABSTRACT

A stabilization bracket device for facilitating servicing of in-line piping regulators includes a bracket, which is removably positionable around a regulator, such as a valve, a pump, a sensor, and the like, which is positioned in-line with a pipe, so that a lower end of the bracket abuts a bottom of the regulator. A support element is engaged to and extends bidirectionally from an upper face of the bracket. Each opposing end of the support element abuts an upper surface of the pipe proximate to a respective opposed end of the bracket. A load imparted by the regulator to the bracket is transferred by the support element onto the pipe, positioning a user to service the regulator.

9 Claims, 5 Drawing Sheets

STABILIZATION BRACKET DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bracket devices and more particularly pertains to a new bracket device for facilitating servicing of in-line piping regulators. The present invention discloses a bracket device comprising a bracket to which a support element is attached. The bracket engages a regulator installed in a pipe and the support element maintains a load of the regulator on the pipe upon separation of the regulator from the pipe.

(2) Description of Related Art Including Information Disclosed Under 37 CFR 1.97 and 1.98

The prior art relates to bracket devices. Prior art bracket devices for pipes comprise a variety of brackets designed to engage a structural element, such as a wall or the ground, and a pipe, so that the pipe is supported. What is lacking in the prior art is a bracket device for stabilizing a regulator installed in a pipe by maintaining a load of the regulator on the pipe upon separation of the regulator from the pipe.

BRIEF SUMMARY OF THE INVENTION

An embodiment of the disclosure meets the needs presented above by generally comprising a bracket, which is configured to be removably positionable around a regulator, such as a valve, a pump, a sensor, and the like, which is positioned in-line with a pipe so that a lower end of the bracket abuts a bottom of the regulator. A support element is engaged to and extends bidirectionally from an upper face of the bracket. Each opposing end of the support element abuts an upper surface of the pipe proximate to a respective opposed end of the bracket. The support element is configured to transfer a load imparted by the regulator to the bracket onto the pipe, positioning a user to service the regulator.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

Figure 1:
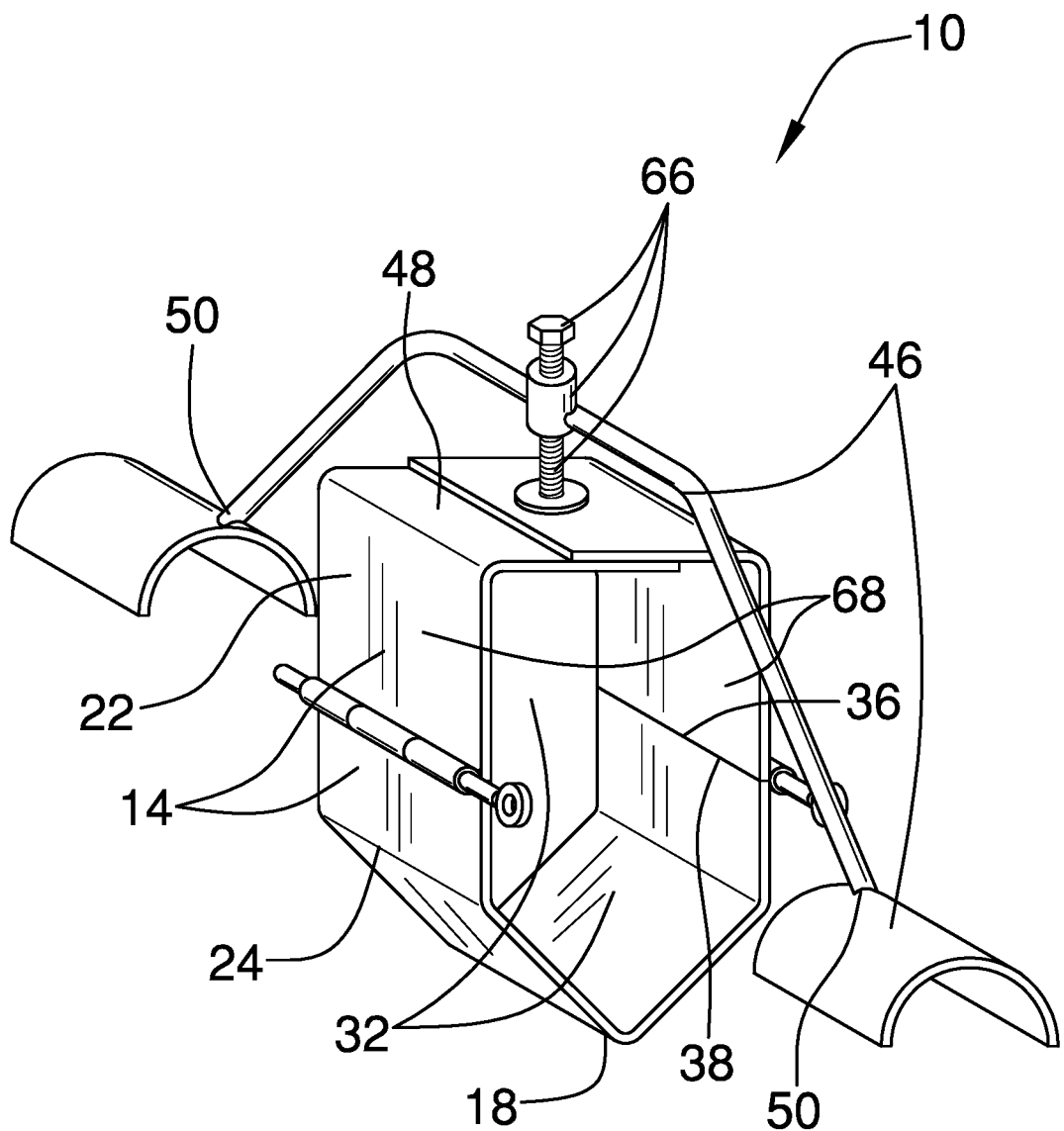
FIG. 1 is an isometric perspective view of a stabilization bracket device according to an embodiment of the disclosure.
Figure 2:
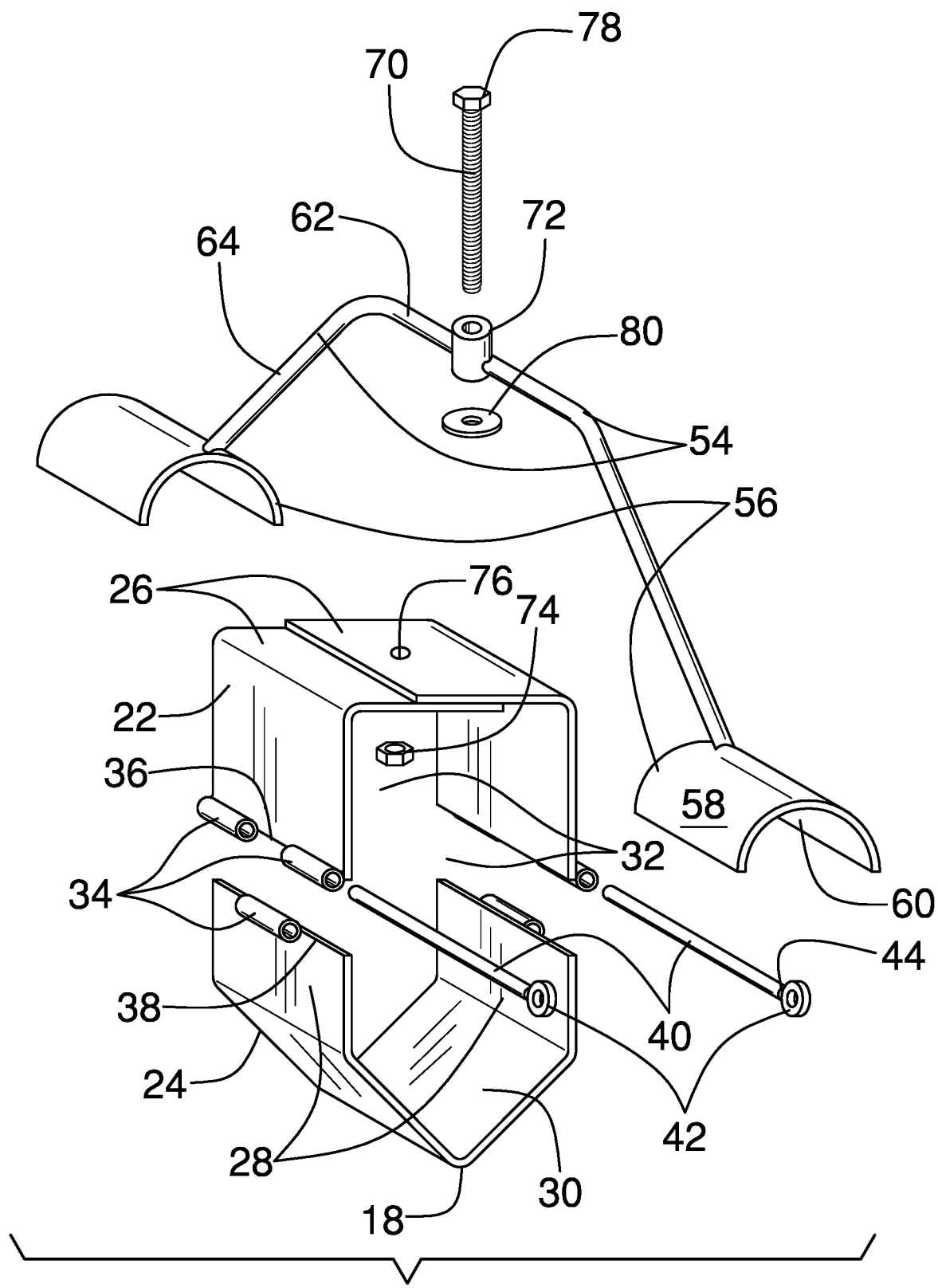
FIG. 2 is an exploded view of an embodiment of the disclosure.
Figure 3:
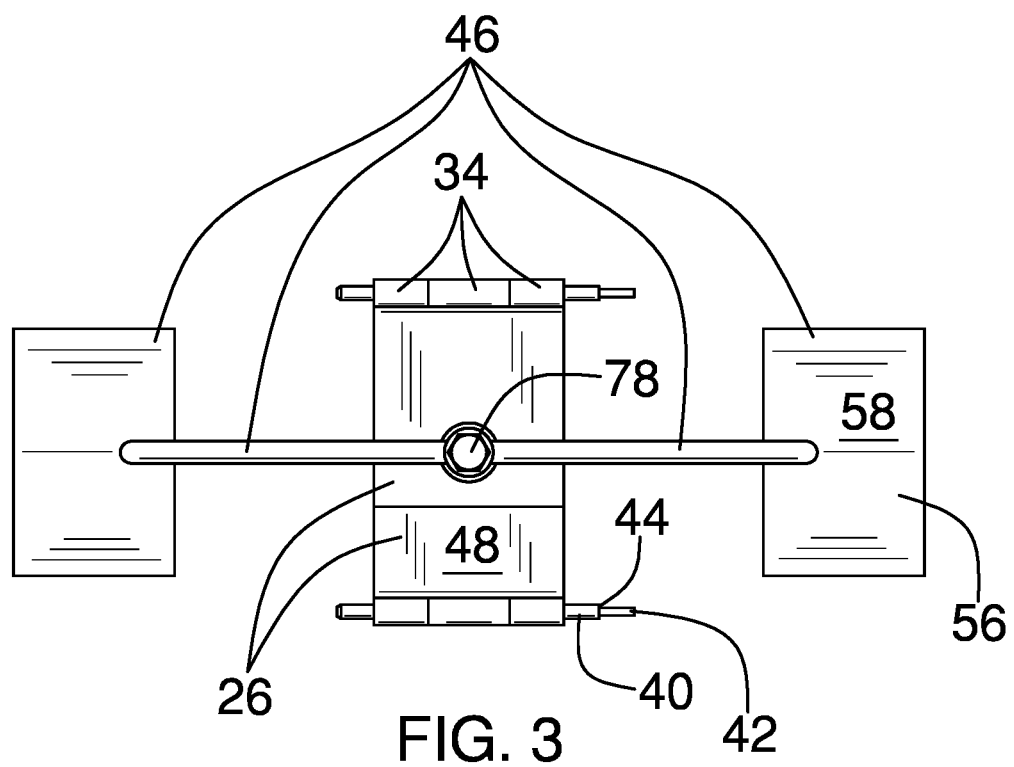
Figure 4:
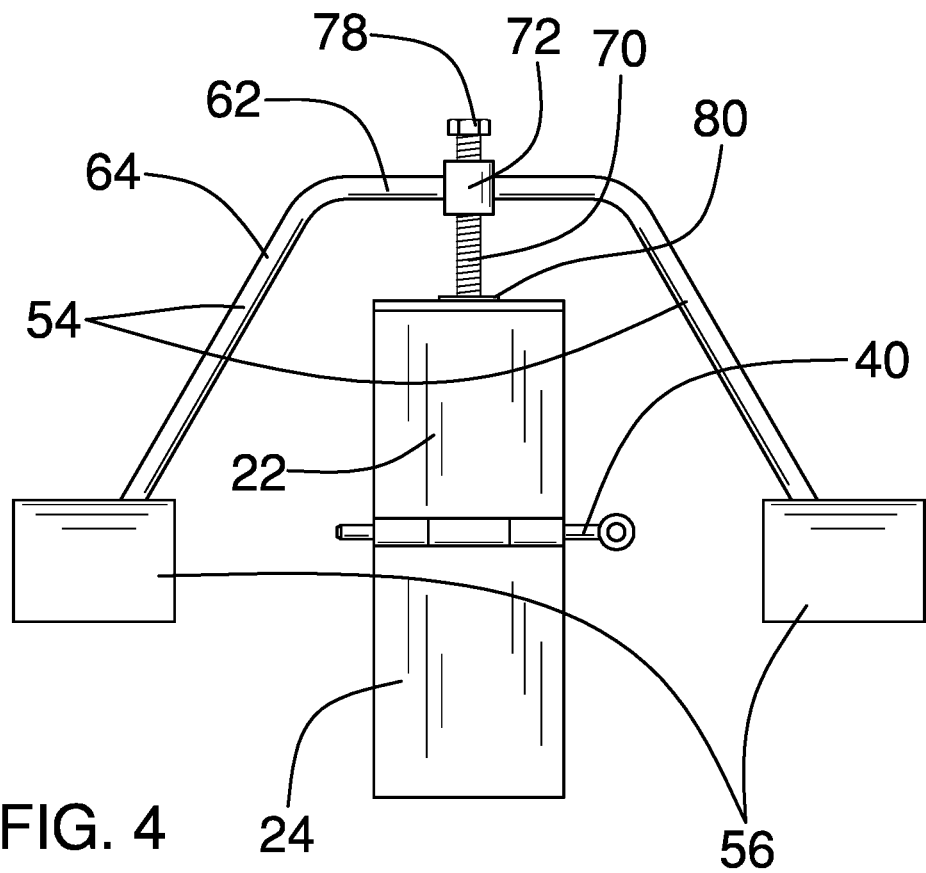
Figure 5:
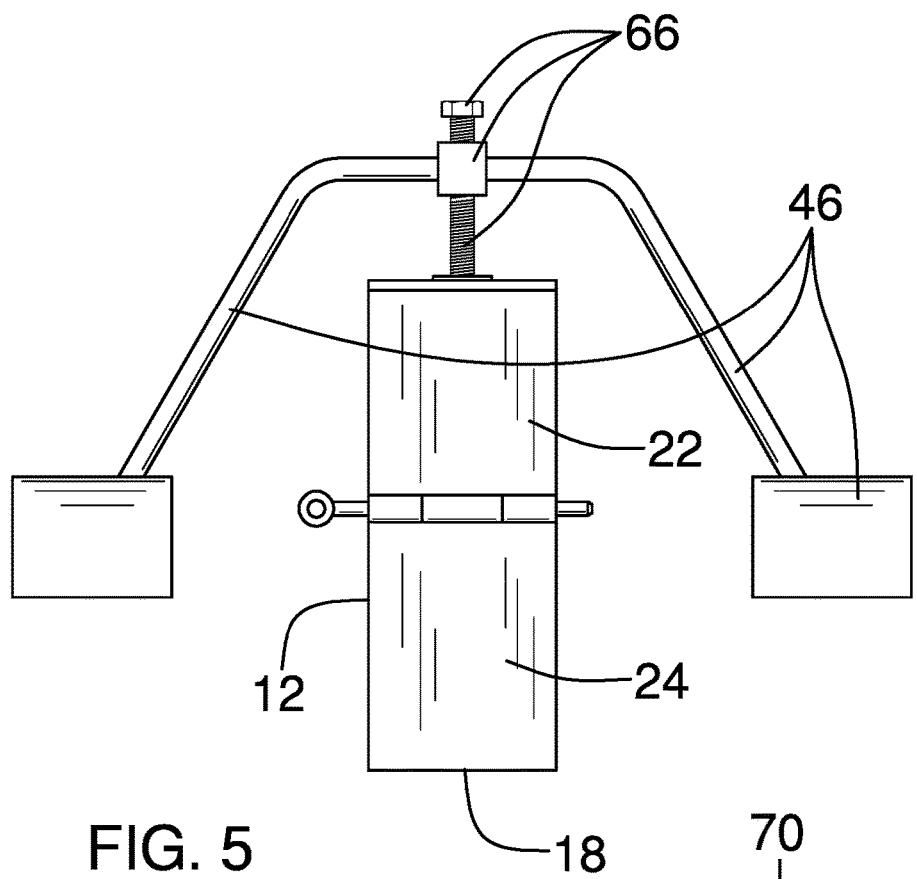
Figure 6:
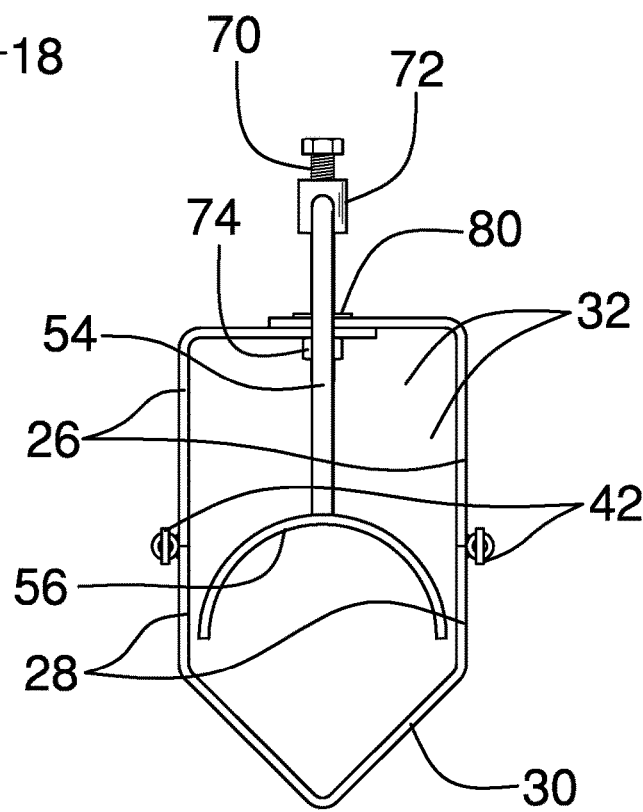
Figure 7:
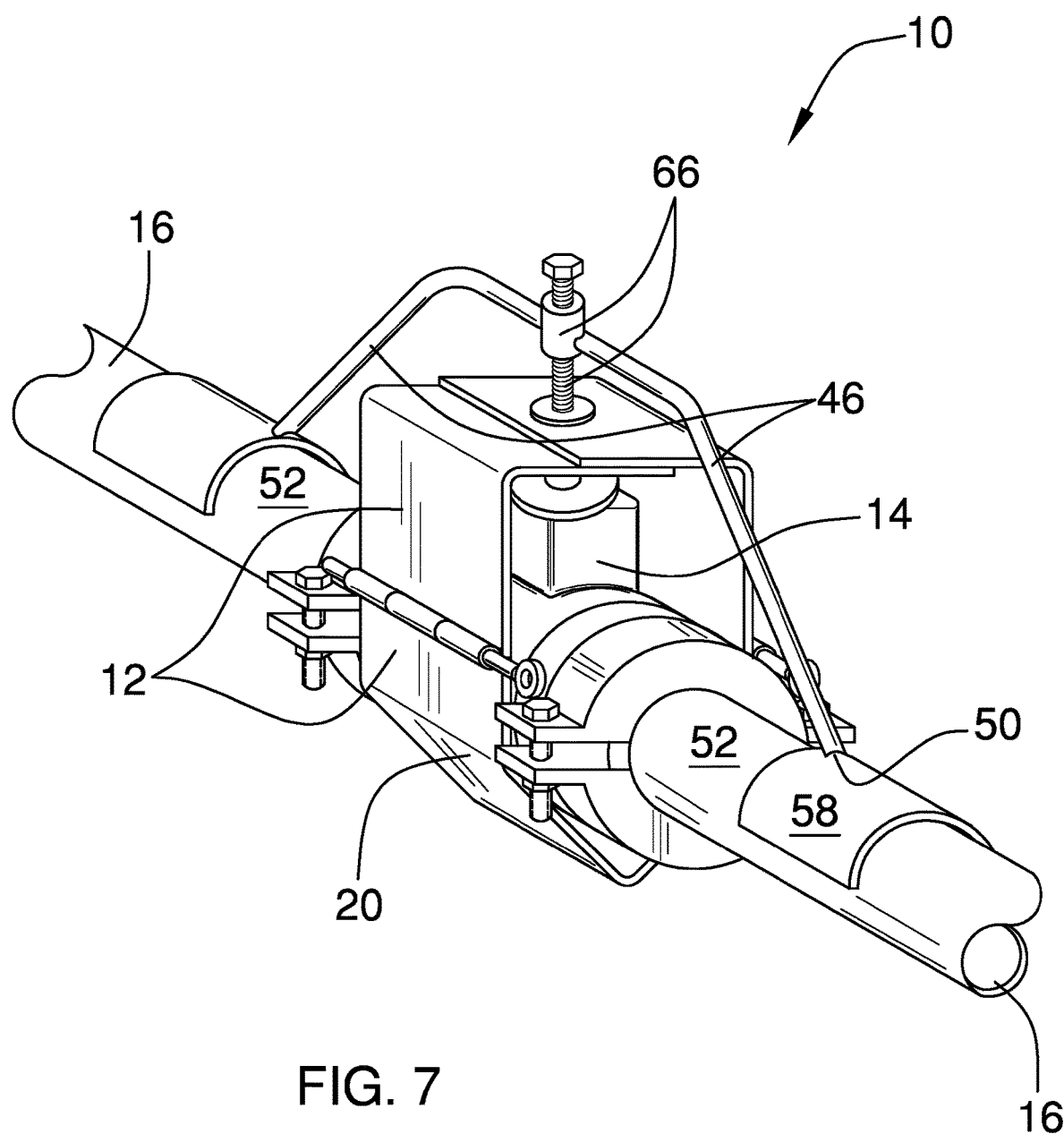

FIG. 3 is a top view of an embodiment of the disclosure.
FIG. 4 is a front view of an embodiment of the disclosure.
FIG. 5 is a rear view of an embodiment of the disclosure.
FIG. 6 is an end view of an embodiment of the disclosure.
FIG. 7 is an in-use view of an embodiment of the disclosure.

DETAILED DESCRIPTION OF THE INVENTION

With reference now to the drawings, and in particular to FIGS. 1 through 7 thereof, a new bracket device embodying the principles and concepts of an embodiment of the disclosure and generally designated by the reference numeral 10 will be described.

As best illustrated in FIGS. 1 through 7, the stabilization bracket device 10 generally comprises a bracket 12, which is configured to be removably positionable around a regulator 14 that is positioned in-line with a pipe 16 so that a lower end 18 of the bracket 12 abuts a bottom 20 of the regulator 14. Regulator 14 in the context of the present invention should be broadly interpreted broadly to include valves, pumps, sensors, joints in the pipe 16, sections of the pipe 16 requiring repair or replacement, and the like.

The bracket 12 comprises an upper section 22 and a lower section 24. The upper section 22 is configured to be removably positionable around an upper portion of the regulator 14. The lower section 24 is selectively engageable to the upper section 22 so that the lower section 24 is removably engaged to the upper section 22 and so that the lower section 24 is positioned around and abuts a lower portion of the regulator 14.

The upper section 22 may comprise a pair of L-shaped plates 26. The lower section 24 may comprise a pair of upper segments 28 and a lower segment 30. The upper segments 28 are substantially parallel so that each upper segment 28 is selectively alignable with a respective L-shaped plate 26. The lower segment 30 is engaged to and extends between the upper segments 28. The lower segment 30 may be substantially V-shaped when viewed from a respective opposed end 32 of the bracket 12.

Each of a plurality of hinge knuckles 34 is engaged to a respective one of a lower endpoint 36 of the upper section 22 and an upper endpoint 38 of the lower section 24. The hinge knuckles 34 are substantially evenly distributed on opposed sides 68 of the bracket 12. Respective hinge knuckles 34 positioned on the upper section 22 are selectively alignable with respective hinge knuckles 34 positioned on the lower section 24 so that a respective hinge pin 40 of a pair of hinge pins 40 is insertable through the respective hinge knuckles 34 to removably engage the lower section 24 to the upper section 22. As shown in FIG. 6, each upper segment 28 of the lower section 24 is hingedly engaged to a respective L-plate. The present invention anticipates the lower section 24 being selectively engageable to the upper section 22 by other engagement means, such as, but not limited to, latches, threaded fasteners, and the like.

Each of a pair of rings 42 is engaged to a terminus 44 of a respective hinge pin 40. The ring 42 is configured to engage a hooking tool (not shown), positioning the user to selectively extract the respective hinge pin 40 to disengage the lower section 24 from the upper section 22. With only one of the hinge pins 40 removed, the lower section 24 will hinge relative to the upper section 22. This allows the bracket 12 to be initially positioned around the regulator 14, and, if the regulator 14 is to be replaced, subsequent removal of the regulator 14 from the bracket 12 and insertion of a replacement into the bracket 12. In some situations, removal of both hinge pins 40 may be required to position the bracket 12 on the regulator 14 and to remove the regulator 14 from the bracket 12.

A support element 46 is engaged to and extends bidirectionally from an upper face 48 of the bracket 12. Each opposing end 50 of the support element 46 abuts an upper surface 52 of the pipe 16 proximate to a respective opposed end 32 of the bracket 12. The support element 46 is configured to transfer a load imparted by the regulator 14 to the bracket 12 onto the pipe 16, positioning a user to service the regulator 14.

The support element 46 may comprise a pair of arms 54 and a pair of arcuate plates 56. Each arm 54 is engaged to and extends from the upper face 48 of the bracket 12 past a respective opposed end 32 of the bracket 12. Each arcuate plate 56 has convex face 58, which is engaged to a respective arm 54 distal from the bracket 12. A concave face 60 of the arcuate plate 56 is configured for insertion of the pipe 16 so that the arcuate plate 56 abuts the upper surface 52 of the pipe 16.

Each arm 54 may comprise a first section 62 and a second section 64. The first section 62 extends in parallel with the upper face 48 of the bracket 12. The second section 64 is engaged to and extends transversely from the first section 62 distal from the bracket 12 so that the second section 64 extends toward the lower end 18 of the bracket 12. The arms 54 may be alternatively shaped, so long as the shape allows positioning of the arcuate plate 56 on the pipe 16.

An extender 66 is engaged to the support element 46 and is operationally engaged to the bracket 12. The extender 66 is positioned to adjust a position of the opposing ends 50 of the support element 46 relative to the upper surface 52 of the pipe 16. The extender 66 may comprise a bolt 70, a threaded tube 72 and a nut 74. The bolt 70 is positioned through a hole 76 centered in the upper face 48 of the bracket 12. The threaded tube 72 is positioned around and is threadedly engaged to the bolt 70. The threaded tube 72 is positioned between a head 78 of the bolt 70 and the upper face 48 of the bracket 12. The support element 46 is engaged to and extends bidirectionally from the threaded tube 72. A washer 80 may be positioned on the bolt 70 between the threaded tube 72 and the bracket 12. The nut 74 is threadedly engaged to the bolt 70 so that rotation of the nut 74 relative to the bolt 70 selectively raises and lowers the support element 46.

In use, the upper section 22 of the bracket 12 is positioned over the upper portion of the regulator 14. The lower section 24 of the bracket 12 then is attached to the upper section 22 using the hinge pins 40. The nut 74 and bolt 70 are used to adjust the arms 54 relative to the bracket 12 to bring the arcuate plates 56 into contact with the upper surface 52 of the pipe 16 and the lower section 24 into abutment with the lower portion of the regulator 14. The load imparted by the regulator 14 to the bracket 12 is transferred by the arms 54 onto the pipe 16, positioning the user to service the regulator 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A stabilization bracket device comprising:
    a bracket configured to be removably positionable around a regulator positioned in-line with a pipe, such that a lower end of the bracket abuts a bottom of the regulator;
    a support element engaged to and extending bidirectionally from an upper face of the bracket, such that each opposing end of the support element abuts an upper surface of the pipe proximate to a respective opposed end of the bracket, wherein the support element is configured for transferring a load imparted by the regulator to the bracket onto the pipe, positioning a user for servicing the regulator; and
    an extender engaged to the support element and being operationally engaged to the bracket, such that the extender is positioned for adjusting a position of the opposing ends of the support element relative to the upper surface of the pipe.

2. The stabilization bracket device of claim 1, wherein the bracket comprises:
    an upper section configured to be removably positionable around an upper portion of the regulator; and
    a lower section selectively engageable to the upper section, such that the lower section is removably engaged to the upper section, and such that the lower section is positioned around and abuts a lower portion of the regulator.

3. The stabilization bracket device of claim 2, wherein: the upper section comprises a pair of L-shaped plates; and the lower section comprises:
   a pair of upper segments, the upper segments being substantially parallel, such that each upper segment is selectively alignable with a respective L-shaped plate, and
   a lower segment engaged to and extending between the upper segments, the lower segment being substantially V-shaped when viewed from a respective opposed end of the bracket.

4. The stabilization bracket device of claim 3, further including a plurality of hinge knuckles, each hinge knuckle being engaged to a respective one of a lower endpoint of the upper section and an upper endpoint of the lower section, the hinge knuckles being substantially evenly distributed on opposed sides of the bracket, such that respective hinge knuckles positioned on the upper section are selectively alignable with respective hinge knuckles positioned on the lower section, such that a respective hinge pin of a pair of hinge pins is insertable through the respective hinge knuckles for removably engaging the lower section to the upper section.

5. The stabilization bracket device of claim 4, further including a pair of rings, each ring being engaged to a terminus of a respective hinge pin, wherein the ring is configured for engaging a hooking tool, positioning the user for selectively extracting the respective hinge pin for disengaging the lower section from the upper section.

6. A stabilization bracket device comprising:
   a bracket configured to be removably positionable around a regulator positioned in-line with a pipe, such that a lower end of the bracket abuts a bottom of the regulator;
   a support element engaged to and extending bidirectionally from an upper face of the bracket, such that each opposing end of the support element abuts an upper surface of the pipe proximate to a respective opposed end of the bracket, wherein the support element is configured for transferring a load imparted by the regulator to the bracket onto the pipe, positioning a user for servicing the regulator; and
   wherein the support element comprises:
      a pair of arms, each arm being engaged to and extending from the upper face of the bracket past a respective opposed end of the bracket; and
      a pair of arcuate plates, each arcuate plate having convex face engaged to a respective arm distal from the bracket, wherein a concave face of the arcuate plate is configured for insertion of the pipe such that the arcuate plate abuts the upper surface of the pipe.

7. The stabilization bracket device of claim 6, wherein each arm comprises:
   a first section extending in parallel with the upper face of the bracket; and
   a second section engaged to and extending transversely from the first section distal from the bracket, such that the second section extends toward the lower end of the bracket.

8. The stabilization bracket device of claim 1, wherein the extender comprises:
   a bolt positioned through a hole centered in the upper face of the bracket;
   a threaded tube positioned around and threadedly engaged to the bolt, the threaded tube being positioned between a head of the bolt and the upper face of the bracket, the support element being engaged to and extending bidirectionally from the threaded tube;
   a washer positioned on the bolt between the threaded tube and the bracket; and
   a nut threadedly engaged to the bolt, such that rotation of the nut relative to the bolt selectively raises and lowers the support element.

9. A stabilization bracket device comprising:
   a bracket configured to be removably positionable around a regulator positioned in-line with a pipe, such that a lower end of the bracket abuts a bottom of the regulator, the bracket comprising:
      an upper section configured to be removably positionable around an upper portion of the regulator, the upper section comprising a pair of L-shaped plates,
      a lower section selectively engageable to the upper section, such that the lower section is removably engaged to the upper section, and such that the lower section is positioned around and abuts a lower portion of the regulator, the lower section comprising:
         a pair of upper segments, the upper segments being substantially parallel, such that each upper segment is selectively alignable with a respective L-shaped plate,
         a lower segment engaged to and extending between the upper segments, the lower segment being substantially V-shaped when viewed from a respective opposed end of the bracket,
      a plurality of hinge knuckles, each hinge knuckle being engaged to a respective one of a lower endpoint of the upper section and an upper endpoint of the lower section, the hinge knuckles being substantially evenly distributed on opposed sides of the bracket, such that respective hinge knuckles positioned on the upper section are selectively alignable with respective hinge knuckles positioned on the lower section, such that a respective hinge pin of a pair of hinge pins is insertable through the respective hinge knuckles for removably engaging the lower section to the upper section, and
      a pair of rings, each ring being engaged to a terminus of a respective hinge pin, wherein the ring is configured for engaging a hooking tool, positioning a user for selectively extracting the respective hinge pin for disengaging the lower section from the upper section;
   a support element engaged to and extending bidirectionally from an upper face of the bracket, such that each opposing end of the support element abuts an upper surface of the pipe proximate to a respective opposed end of the bracket, wherein the support element is configured for transferring a load imparted by the regulator to the bracket onto the pipe, positioning the user for servicing the regulator, the support element comprising:
      a pair of arms, each arm being engaged to and extending from the upper face of the bracket past a respective opposed end of the bracket, each arm comprising:
         a first section extending in parallel with the upper face of the bracket, and
         a second section engaged to and extending transversely from the first section distal from the bracket, such that the second section extends toward the lower end of the bracket, and a pair of arcuate plates, each arcuate plate having convex face engaged to a respective arm distal from the bracket, wherein a concave face of the arcuate plate is configured for insertion of the pipe such that the arcuate plate abuts the upper surface of the pipe; and an extender engaged to the support element and being operationally engaged to the bracket, such that the extender is positioned for adjusting a position of the opposing ends of the support element relative to the upper surface of the pipe, the extender comprising:

a bolt positioned through a hole centered in the upper face of the bracket, a threaded tube positioned around and threadedly engaged to the bolt, the threaded tube being positioned between a head of the bolt and the upper face of the bracket, the support element being engaged to and extending bidirectionally from the threaded tube, a washer positioned on the bolt between the threaded tube and the bracket, and a nut threadedly engaged to the bolt, such that rotation of the nut relative to the bolt selectively raises and lowers the support element.

* * * * *